(12) United States Patent
Mackin et al.

(10) Patent No.: US 8,205,892 B2
(45) Date of Patent: Jun. 26, 2012

(54) METHOD OF AUTOMATICALLY CHANGING WHEEL TOE ANGLE

(75) Inventors: Ryan P. Mackin, Milan, IL (US); Daniel J Burke, Cordova, IL (US); Bruce A. Coers, Hillsdale, IL (US); Glenn E Pope, Viola, IL (US); James K Adamson, Colona, IL (US)

(73) Assignee: Deere & Company, Moline, IL (US)

( * ) Notice: Subject to any disclaimer, the term of this patent is extended or adjusted under 35 U.S.C. 154(b) by 153 days.

(21) Appl. No.: 12/847,245

(22) Filed: Jul. 30, 2010

(65) Prior Publication Data

US 2012/0025477 A1 Feb. 2, 2012

(51) Int. Cl.
*B62D 17/00* (2006.01)

(52) U.S. Cl. .................. 280/5.522; 280/86.75; 280/5.52; 180/209; 180/906

(58) Field of Classification Search .................. 180/906, 180/209, 9.48; 280/5.522, 5.52, 86.75
See application file for complete search history.

(56) References Cited

U.S. PATENT DOCUMENTS

| | | | | |
|---|---|---|---|---|
| 2,074,685 A | * | 3/1937 | Engstrom | 180/6.4 |
| 2,209,804 A | * | 7/1940 | Ashley | 180/209 |
| 3,033,591 A | * | 5/1962 | Ward | 280/86.75 |
| RE26,129 E | * | 12/1966 | Purshce | 172/206 |
| 3,309,097 A | * | 3/1967 | Seeber | 280/5.508 |
| 3,416,622 A | * | 12/1968 | Helm et al. | 180/6.7 |
| 3,498,630 A | * | 3/1970 | Crawford | 280/86.758 |
| 3,712,398 A | * | 1/1973 | Althaus | 180/9.48 |
| 3,749,193 A | * | 7/1973 | Blase et al. | 180/9.48 |
| 5,027,275 A | * | 6/1991 | Sakamoto et al. | 701/36 |
| 5,143,400 A | * | 9/1992 | Miller et al. | 280/5.522 |
| 6,176,334 B1 | * | 1/2001 | Lorenzen | 180/9.48 |
| 6,347,802 B1 | * | 2/2002 | Mackle et al. | 280/5.521 |
| 6,402,168 B1 | * | 6/2002 | Chino et al. | 280/86.758 |
| 6,962,355 B2 | * | 11/2005 | Kwon | 280/86.75 |
| 7,325,818 B1 | * | 2/2008 | Kwon et al. | 280/86.758 |
| 7,516,965 B2 | * | 4/2009 | Horiuchi | 280/5.52 |
| 7,543,825 B2 | * | 6/2009 | Yamada | 280/5.52 |
| 7,766,344 B2 | * | 8/2010 | Buma | 280/5.511 |
| 7,878,511 B2 | * | 2/2011 | Haeusler et al. | 280/5.52 |
| 7,896,360 B2 | * | 3/2011 | Buma | 280/5.511 |
| 7,988,165 B2 | * | 8/2011 | Nishigaya | 280/124.131 |

(Continued)

*Primary Examiner* — Paul N Dickson
*Assistant Examiner* — Nicole Verley

(57) ABSTRACT

A method for changing the track of a vehicle (100) having first and second wheels (108, 110) disposed on opposing sides of the vehicle (100) along a line generally perpendicular to the direction of travel of the vehicle, the first and second wheels (108, 110) are supported on first and second wheel supports (114, 116, 204) to permit the track of the first and second wheels (108, 110) to be adjusted, at least one actuator (218, 220) is coupled to at least one wheel of the first and second wheels (108, 110) and is configured to change the toe angle of said first and second wheels (108, 110), and an electronic control unit (402) is coupled to the actuator (218, 220) that is configured to command the actuator (218, 220) to change the toe angle, the method comprising the steps of changing the toe angle of the first and second wheels (108, 110); rolling the vehicle (100) on the first and second wheels (108, 110) over the ground to generate opposing lateral forces on the first and second wheels (108, 110); and applying the opposing lateral forces to the first and second wheel supports (114, 116, 204) to change the track of the first and second wheels (108, 110).

8 Claims, 3 Drawing Sheets

U.S. PATENT DOCUMENTS

| | | | |
|---|---|---|---|
| 8,050,819 B2* | 11/2011 | Suyama et al. | 701/37 |
| 8,073,592 B2* | 12/2011 | Nishimori et al. | 701/39 |
| 2006/0107538 A1* | 5/2006 | Harrill | 33/203.18 |
| 2007/0273117 A1* | 11/2007 | Kwon | 280/86.75 |
| 2009/0140502 A1* | 6/2009 | Sasaki et al. | 280/5.522 |
| 2011/0095499 A1* | 4/2011 | Liu et al. | 280/86.75 |

* cited by examiner

METHOD OF AUTOMATICALLY CHANGING WHEEL TOE ANGLE

FIELD OF THE INVENTION

This invention relates to motor vehicles. More particularly it related to motor vehicles having adjustable track. Even more particularly it is related to motor vehicles with an adjustable track that are configured to change toe angle to assist in changing the track.

BACKGROUND OF THE INVENTION

Automatically adjustable toe angle systems for automobiles have been in existence for many years. International class B62D17 is directed to automatic camber, caster, and toe-in adjustment systems.

WO2010045999 shows automatic adjustment devices for the toe angle of an automobile by sensing driving-critical conditions.

EP2163412 teaches algorithms for a toe angle adjustment ECU of an automobile.

DE 102008027326 teaches a single actuator adjustment system for simultaneously changing the toe angle of automobile wheels.

WO2009113642 teaches a toe angle adjustment controller for dynamically adjusting the toe angle of an automobile's rear wheels.

EP2067689 teaches a toe angle adjustment system for dynamically adjusting the rear wheel toe angle based on a steering angle velocity.

None of the above systems have been provided on vehicles that have an adjustable track.

None of the above systems are used to solve the problem of changing the vehicle track with a reduced force.

SUMMARY OF THE INVENTION

The technical problem solved by the present invention is that of changing the toe angle of a vehicle to assist in changing the track of a vehicle by reducing or eliminating the force required to change the track of a vehicle.

The solution, as provided herein, includes a method of automatically changing the toe angle of the wheels and then moving the vehicle over the ground with this changed toe angle in order to increase or decrease the track of the vehicle.

The operator may manually select the toe angle he desires and the system may be configured to responsively and automatically change the toe angle. The operator can then drive the vehicle forward or backward until the inward or outward for generated by the toe-in or toe-out pushes together or pulls apart the wheels to thereby decrease or increase the track, respectively.

The operator may manually select a desired track and the system may automatically and responsively change the toe angle as the operator drives the vehicle over the ground until the appropriate track is reached. The system may automatically change the toe angle once the vehicle has achieved the selected track to prevent further changes in track.

The terms "front", "in front of", "forward", "behind", "rear", "to the rear of" and the like refer to the direction the vehicle travels during normal field operations.

"Track" as the term is used herein refers to the spacing between a rear wheel on the left side of the vehicle and a rear wheel on the right side of the vehicle.

As used herein, wheels are "toe-out" when planes passing through the wheels and normal to the rotational axes of the wheels intersect each other at ground level at a point forward of both wheel hubs.

As used herein, wheels are toe-in when planes passing through the wheels and normal to the rotational axes of the wheels intersect each other at ground level at a point to the rear of both wheel hubs.

DETAILED DESCRIPTION OF THE PREFERRED EMBODIMENTS

In a vehicle with adjustable track, an automatic toe adjustment system is provided to reduce or eliminate the effort required to increase or decrease the track of the vehicle.

Figure 1:
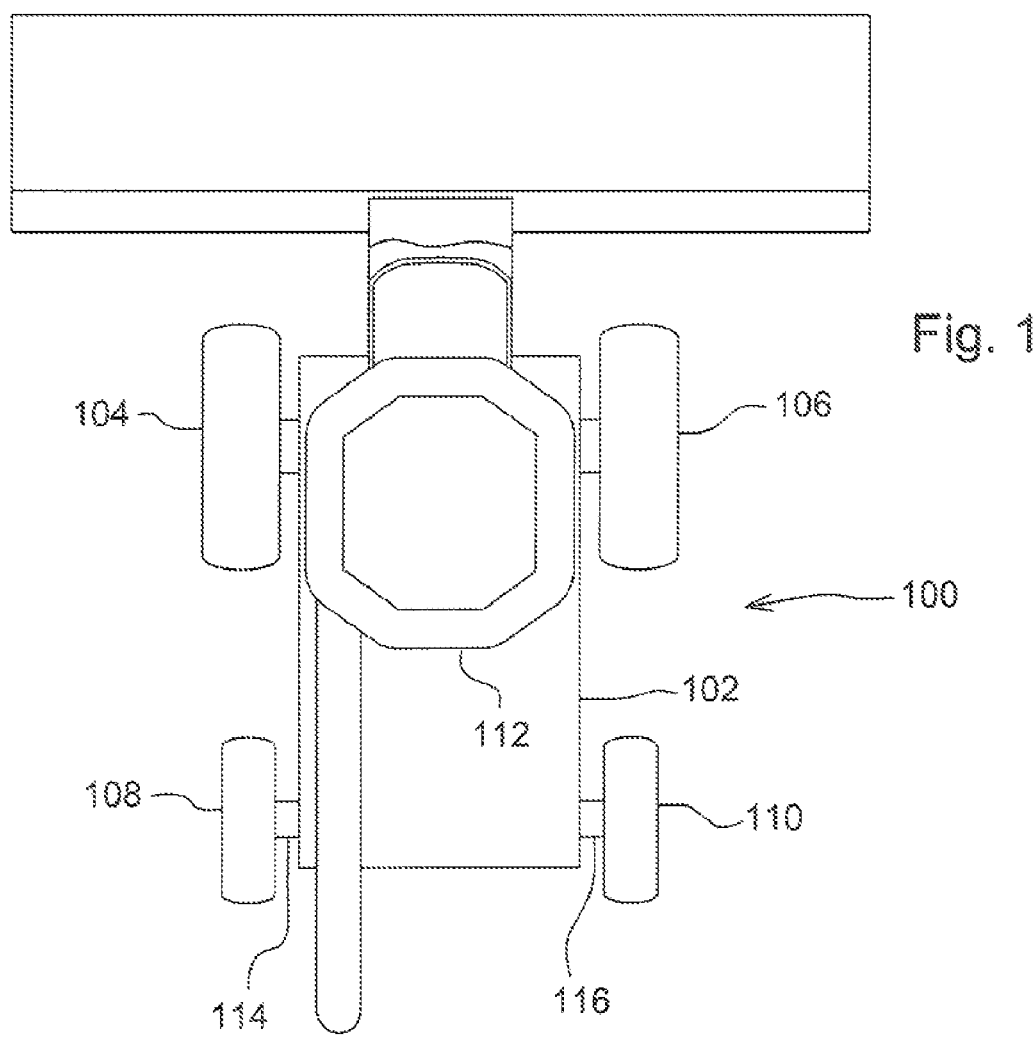
FIG. 1 is a plan view of a vehicle in accordance with the current invention.

Referring to FIG. 1, the vehicle 100, here shown as a combine harvester, consists of a chassis 102 supported on two front wheels including left front wheel 104 and right front wheel 106, and two rear wheels including left rear wheel 108 and right rear wheel 110.

All four wheels are driven and steered by motors (not shown) under the control of an operator who operates the vehicle from an operator's cab 112.

The vehicle 100 has extendible rear axles including a left rear extendible axle 114 and a right rear extendible axle 116.

Left rear extendible axle 114 is coupled to and supports left rear wheel 108 for rotation. When it is extending, left rear extendible axle 114 moves left rear wheel 108 outward and away from the side of the vehicle and moves the wheel inwardly when retracting.

Right rear extendible axle 116 is coupled to and supports right rear wheel 110 for rotation.

When it is extending, right rear extendible axle 116 moves right rear wheel 110 outward and away from the side of the vehicle, and moves the wheel inwardly when retracting.

Figure 2:
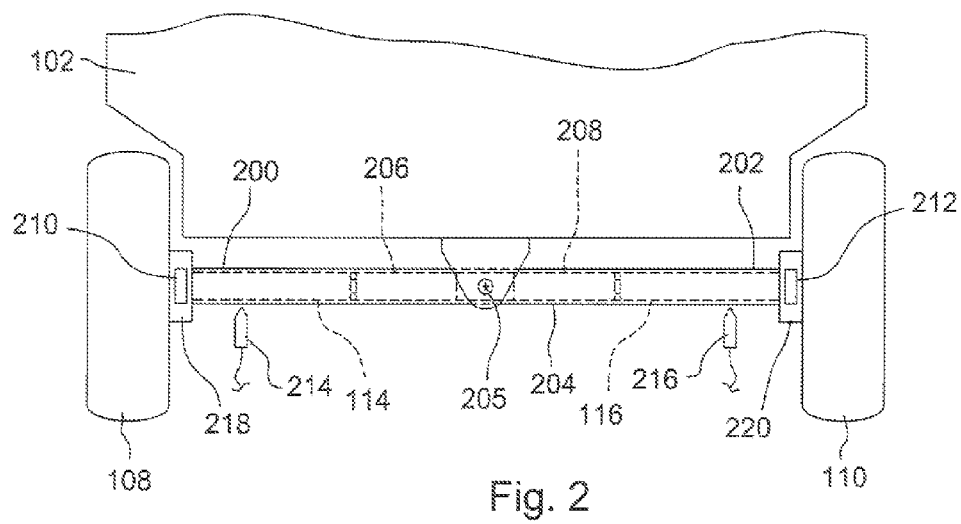
FIG. 2 is a rear view of the rear axle arrangement of the vehicle before the toe angle is changed and the track increased.

Referring to FIG. 2, extendible axles 114, 116 are supported on and slidably received in opposing ends 200, 202 of a central axle portion 204 that is coupled to the chassis 102 at a central pivot point 205 to pivot with respect to chassis 102 about a pivoting axis that extends generally horizontally and longitudinally parallel to the direction of travel of the vehicle over the ground in a straight line. This pivoting axle arrangement is typically of combine harvesters and is provided to permit the vehicle load to be continuously equalized on the left and right rear wheels as the vehicle moves through the field.

The extendible axles 114, 116 are coupled to actuators 206, 208, here shown as hydraulic cylinders, which are disposed to extend and retract the extendible axles 114, 116 with respect to the sides of the vehicle.

Left and right rear wheel angle position sensors 210, 212 are disposed to sense the steering angle of the left and right rear wheels, respectively. They provide signals indicative of the wheel angle positions of the rear wheels. The sensors indicate the angular position to which each wheel is steered. The toe angle is the difference between the steering angle of the left rear wheel and the steering angle of the right rear wheel. Thus the steering angles of the left rear wheel and the right rear wheel indicate the toe angle.

Two axle extension sensors 214, 216 are disposed to sense the degree of extension of extendable rear axles 114, 116, respectively. They provide signals indicative of the degree of extension of the extendable rear axles.

Left and right steering actuators 218, 220 are fixed to the outer ends of extendable rear axles 114, 116, respectively, and are configured to steer the left and right rear wheels 108, 110 both to the left and to the right with respect to a straightahead position.

It is desirable to extend or retract the rear wheels. Extending and retracting the rear wheels changes the track of the rear wheels. In one instance, it may be desirable to extend the wheels to a first track spacing to harvest a first row crop with a first row spacing, and then change the track to harvest a second row crop in a second field with a second and different row spacing.

Actuators 206, 208 may be extended and retracted gradually as the vehicle moves through the field in order to extend and retract extendable rear axles 114, 116, respectively. On occasion, however, it may be desirable to rapidly change the track of the rear wheels. If, for example, the operator attempts to use actuators 206, 208 to extend the extendable rear axles when the vehicle is stationary and the rear wheels have sunk in the earth, actuators 206, 208 may be unable to extend the extendable rear axles without damaging some portion of the vehicle.

Figure 3:
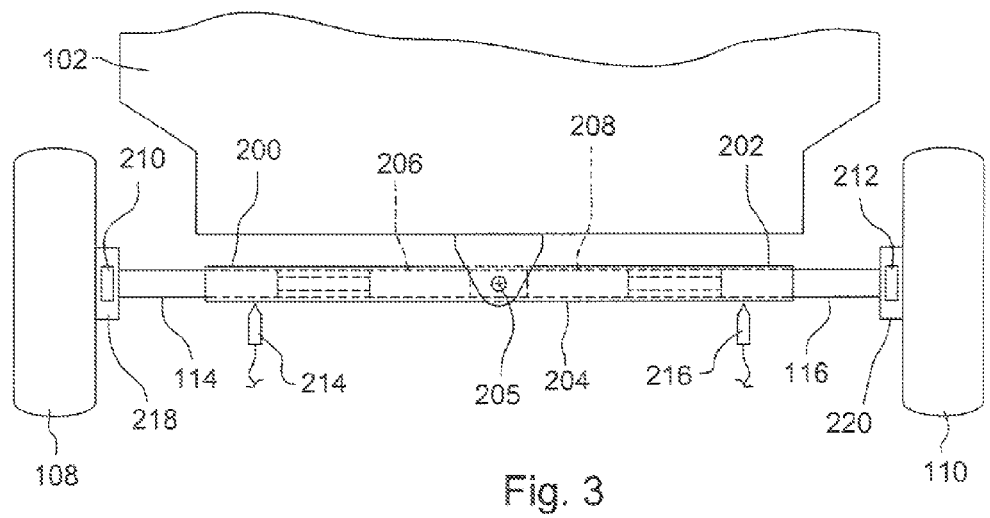
FIG. 3 is a rear view of the rear axle arrangement of the vehicle after the toe angle has been changed and the track increased.

FIG. 3 illustrates the arrangement of the rear axle when the extendable axles 114, 116 have been extended. They are shown telescoped outward from the central axle portion 204 which is tubular and in which the extendable axles 114, 116 are slidably and telescopically supported.

To make this extension process easier and reduce the forces applied to the rear axle, the system is configured to change the toe angle of the rear wheel to a more toe-in or more toe-out angle during the axle extension process, depending upon whether the track is being decreased or increased, respectively.

In one mode of operation, the system is configured to increase the track by signaling actuators 218, 220 to move the rear wheels to a toe-out position. In a toe-out position, when the vehicle moves forward, the left rear wheel 108 pulls left rear extendable axle 114 outward to the left and the right rear wheel 110 pulls right rear extendable axle 116 outward to the right, in the opposite direction, thus tending to increase the distance between the 2 wheels.

At the same time, the system is configured to signal actuators 206, 208 to extend and to apply force to extendable rear axles 114, 116, thereby assisting in sliding extendable rear axles 114, 116 outward from central axle portion 204.

In an alternative arrangement, clamps may be provided in place of actuators 206, 208, and the system may automatically release these clamps to permit extendable rear axles 114, 116 to extend outward as the wheels in their toe-out position extend the rear axles as the vehicle rolls forward over the ground.

In another mode of operation, the system is configured to decrease the track by signaling actuators 218, 220 to move the rear wheels to a toe-in position. In a toe-in position, when the vehicle moves forward, the left rear wheel 108 pulls left rear extendable axle 114 inward to the right and the right rear wheel 110 pulls right rear extendable axle 116 inward to the left, in the opposite direction, thus tending to decrease the distance between the 2 wheels.

At the same time, the system is configured to signal actuators 206, 208 to retract, thereby assisting in sliding extendable rear axles 114, 116 inward into central axle portion 204.

In an alternative arrangement, clamps may be provided in place of actuators 206, 208, and the system may automatically release these clamps to permit extendable rear axles 114, 116 to extend outward as the wheels in their toe-out position extend the rear axles as the vehicle rolls forward over the ground.

In a third mode of operation, the system is configured to extend the extendable rear axles in the same manner described above, but by moving the wheels to a toe-in position, and rolling the vehicle over the ground in reverse.

In a fourth mode of operation, the system is configured to retract the extendable rear axles in the same manner described above, but by moving the wheels to a toe-out position, and rolling the vehicle over the ground in reverse.

In one variation of the above modes of operation, the system is configured to change the track by first extending (or retracting) one axle and then by extending (or retracting) the other axle. This reduces the power demands on the engine by only requiring one actuator 206, 208 to be operated at a time.

In another variation of the above modes of operation, the system is configured to change the track by simultaneously extending and retracting both axles. This requires more power, but it permits the track change to occur faster.

In another variation of the above modes of operation, the system is configured to begin the track change process at the operator's command and to cease the track change process by the operator's command using an operator input device.

In another variation of the above modes of operation, the system is configured to begin the track change process at the operator's command and to end the track change process automatically when a particular track has been achieved.

In this variation, the operator selects a desired track with an operator input device. The system responsively increases (or alternatively decreases) the toe angle. As the vehicle is driven over the ground, the track is increased (or alternatively decreased). The system is configured to repeatedly monitor the axle extension sensors 214, 216 and to compare the sensed axle extension with the operator's selected track as the track is increased (or alternatively decreased). Once the system determines that the track is equal to the operator's selected track in this comparison, the system automatically, and with no additional input from the operator, changes the toe angle to reduce or eliminate the ground forces applied to the wheels that work to increase (or alternatively decrease) the track.

The process of changing the track in any of the above modes of operation can be done passively using solely the force generated by a toe in or toe out orientation of the rear wheels and rolling the vehicle over the ground.

Alternatively the process of changing the track in any of the modes of operation can be actively by the combined effort of (1) rolling the vehicle (while having a non-zero toe angle, either toe in or toe out) and (2) driving the actuators 206, 208 to assist this operation by track change process can be assisted by and to process by extending (or retracting) the extendable rear axles 114, 116 at the operator's command.

The system is also configured to calculate an appropriate degree of axle extension of each of the extendable rear axles 114, 116, and to cease extending the axles when it determines that the appropriate degree of extension has been reached. The system is configured to cease extending the axles by (1) locking actuators 206, 208, and/or by (2) locking the clamps discussed above and/or by steering rear wheels 108, 110 to a straightahead (or more straightahead) position using actuators 218, 220.

The system is configured to determine that the appropriate degree of extension of each of the rear extendable axles 114, 116 has have been reached by monitoring sensors 214, 216, respectively.

Figure 4:
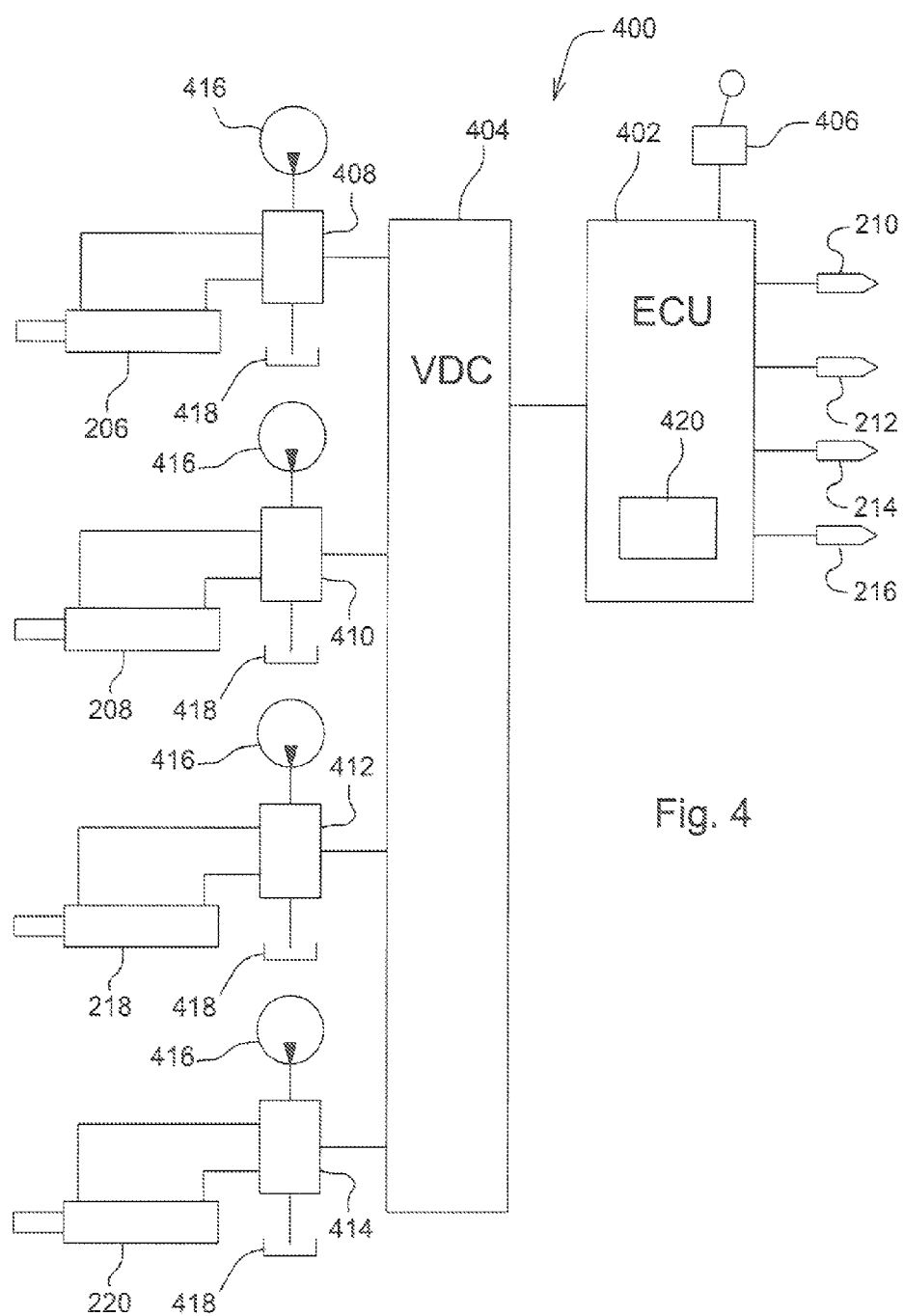
FIG. 4 is a schematic diagram of the automatic toe angle adjustment system.

FIG. 4 shows a schematic diagram of automatic adjustable toe angle system 400. An electronic control unit (ECU) 402 is coupled to left and right wheel angle position sensors 210, 212; left and right rear axle extension sensors 214, 216; valve driver circuit 404; and operator input device 406. Valve driver circuit 404, is coupled to electronic control valves 408, 410, 412, and 414, that are interned coupled to end selectively drive left actuator 206, right actuator 208, left steering actuator 218, and right steering actuator 220. Each of the electronic control the House 408, 410, 412, and 414 is respectively coupled to a source of hydraulic fluid under pressure 416 and a low-pressure hydraulic fluid return reservoir 418.

ECU 402 is a digital microprocessor based electronic control unit including a digital memory 420 which comprise a plurality of digital machine-readable instructions. These instructions configure ECU 402, and hence configure the system 400 to operate in all the modes of operation and their alternatives that are described herein.

ECU 402 is configured by its instructions to read the signals provided by sensors 210, 212, 214, 216, and operator input device 406. Operator input device 406 is manually operable by the operator to permit the operator to select any of the modes of operation, alternative modes of operation, and commands or selections described herein. Operator input device 406 may comprise any arrangement of joysticks, knobs, quadrant levers, handles, switches, displays, touch screens, touch pads, digitizer, voice-recognition system or other device configured to transmit signals to ECU 402 for further processing as a digital value.

ECU 402 is further configured by its instructions to perform the calculations described above, and to responsively signal valve driver circuit 404 to drive valves 408, 410, 412, 414 to change the toe angle and track.

The invention is not limited to the particular embodiment illustrated herein, but includes any embodiment that falls within the scope of the appended claims.

For example, ECU 402 is schematically illustrated in FIG. 4 as a single item. ECU 402 can include multiple digital microprocessors. They can be disposed apart from each other. They can be connected over a digital computer network. They may share the computational requirements to perform the functions described herein. In a preferred arrangement, ECU 402 comprises a plurality of digital microprocessor-based electronic control units that are coupled together over a communications bus, preferably a serial communications bus, more preferably a CAN bus, and even more preferably a CAN bus in accordance with the J1939 standard.

As a further example, the rear wheels are shown supported on an extendable axle that is extended by hydraulic cylinders to change the track. In another arrangement, the rear wheels may be supported on an arm that is coupled to the chassis to pivot toward or away from the chassis and thereby change the track. In another arrangement, each rear wheel may be supported on a multiple bar mechanical linkage coupled to the chassis to permit the rear wheels to move toward or away from the chassis and thereby change the track.

As yet another example, while hydraulic actuators are disclosed herein, the actuators may be electrical, electrohydraulic, or pneumatic actuators.

Linear actuators are illustrated herein to extend and retract the rear extendable axles. These actuators may be rotary actuators.

A single actuator is disclosed herein for extending each axle, and a single actuator is disclosed herein for steering each wheel. In an alternative arrangement, a plurality of actuators may function together to both extend the axles and to steer the wheels.

U.S. patent application Ser. No. 12/463,628, which was filed May 11, 2009 shows extendable axle, actuator and sensor arrangements that can all be substituted for the arrangement disclosed herein. The '628 application is incorporated herein by reference for all that it teaches. All of the embodiments of the '628 application are configured as described herein to extend the axles by changing the toe angle, and therefore all of the embodiments of the '628 application, configured as described herein, fall within the scope of the present claims.

The invention claimed is:

1. A method for changing the track of a vehicle (100) having first and second wheels (108, 110) disposed on opposing sides of the vehicle (100) along a line generally perpendicular to the direction of travel of the vehicle, the first and second wheels (108, 110 are supported on first and second wheel supports (114, 116, 204) to permit the track of the first and second wheels (108, 110) to be adjusted, at least one actuator (218, 220) is coupled to at least one wheel of the first and second wheels (108, 110) and is configured to change the toe angle of said first and second wheels (108, 110), and an electronic control unit (402) is coupled to the actuator (218, 220) that is configured to command the actuator (218, 220) to change the toe angle, the method comprising the steps of:

changing the toe angle of the first and second wheels (108, 110);

rolling the vehicle (100) on the first and second wheels (108, 110) over the ground to generate opposing lateral forces on the first and second wheels (108, 110);

applying the opposing lateral forces to the first and second wheel supports (114, 116, 204) to change the track of the first and second wheels (108, 110).

2. The method of claim 1, wherein the step of changing the toe angle further comprises the steps of:

transmitting an operator input signal from an operator input device (406) to the electronic control unit (402);

calculating a toe angle drive signal based at least upon the operator input by the electronic control unit (402); and applying the toe angle drive signal at least to the at least one actuator (218, 220).

3. The method of claim 1, wherein the step of applying the opposing lateral forces to the wheel supports (114, 116, 204) to change the track of the vehicle further comprises the steps of:

releasing the first wheel support (114) to permit the first wheel (108) to move laterally with respect to the vehicle (100);

then moving the first wheel (108) laterally with respect to the vehicle to change the track of the first and second wheels (108, 110);

then locking the first wheel support (114) to prevent lateral movement of the first wheel (108) with respect to the vehicle (100);

releasing the second wheel support (116) to permit the second wheel (110) to move laterally with respect to the vehicle (100);

then moving the second wheel (110) laterally with respect to the vehicle (100) to change the track of the first and second wheels (108, 110);

then locking the second wheel support (116) to prevent lateral movement of the second wheel (110) with respect to the vehicle (100).

4. The method of claim 3, further comprising at least a second actuator (206), and further wherein the electronic control unit (402) is coupled to the at least the second actuator (206) to drive the second actuator (206), and further wherein the at least the second actuator (206) is configured to assist the first actuator (218) in changing the track of the first and second wheels.

5. The method of claim 4, wherein the first and second actuators (218, 206) are coupled to the first wheel (108) and cooperate to move the first wheel (108) laterally with respect to the vehicle.

6. The method of claim 5, wherein the vehicle further comprises a third actuator (220) and a fourth actuator (208), and further wherein the electronic control unit (402) is coupled to the third and fourth actuators (220, 208) to drive the actuators (220, 208), and further wherein the third and fourth actuators (220, 208) are configured to change the toe angle of the second wheel (110) and to move the second wheel (110) laterally with respect to the vehicle (100).

7. The method of claim 1, further comprising the step of:
repeatedly calculating by the electronic control unit (402) the track of the first and second wheels (108, 110) while the track of the wheels (108, 110) is changing until the track reaches a predetermined value.

8. The method of claim 7, further comprising the step of reducing the toe angle after the track has achieved the predetermined value.

* * * * *